J. Campbell,
Corn Planter.
No. 96,546.    Patented Nov. 9, 1869.

ATTEST.
Jas. H. Layman
Sam'l Knight

Knight Bros.
Attys for
J. Campbell.

UNITED STATES PATENT OFFICE.

JAMES CAMPBELL, OF HARRISON, OHIO, ASSIGNOR TO HIMSELF AND WILLIAM CAMPBELL, OF SAME PLACE.

IMPROVEMENT IN SEED-PLANTERS.

Specification forming part of Letters Patent No. 96,546, dated November 9, 1869.

*To all whom it may concern:*

Be it known that I, JAMES CAMPBELL, of Harrison, Hamilton county, Ohio, have invented a certain new and useful Improvement in Corn-Planters; and I hereby declare the following to be a full, clear, and exact description thereof, reference being had to the accompanying drawings, making part of this specification.

My present invention relates to improvement of a corn-planter patented to myself and William Campbell the 8th day of May, 1866, No. 54,642.

The first part of my improvement consists in making the tread of the ground-wheel of a V form, so as to turn aside or cut any clods in its course.

The second part of my improvement consists in making the disk carrying the sets of concentric gears upon the ground or drive wheel, while forming an essential part of said wheel when in place, separable from the remainder, so as to admit of the renewal of the gearing without discarding the whole wheel in case the cogs should wear out or be broken.

The third part of my improvement consists in extending the cover of the seed-box so far back as to form a roof over the exposed part of the seeding apparatus and seed-spout.

The fourth part of my improvement consists in the form and position given, to improve its operation, to the gravitating finger or forwarder by which the superfluous grain is pushed back from the seed-cavities when the latter are approaching the discharge aperture, the falling grain being also assisted in its descent by that of the forwarder.

The fifth part of my improvement consists in the application of a reversible gage-plate beneath the seed-disk, the said plate having at its opposite ends frusto-conical holes differing from each other in size, and either of which is made to form the discharge-throat of the seed-cavities; the said diversity of size in the throat-apertures being for the purpose of making the same applicable to grains of various size.

The sixth part of my improvement consists in an improved combination of devices for adjusting the covering-shares.

Figure 1:
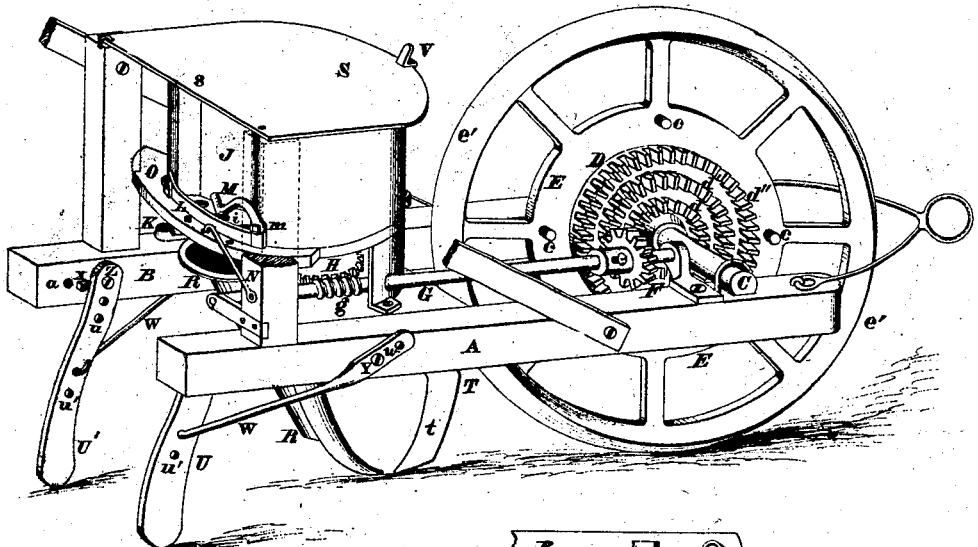
Figure 2:
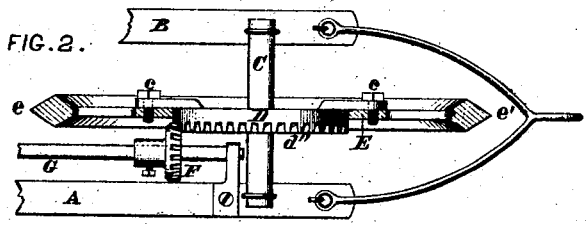
Figure 3:
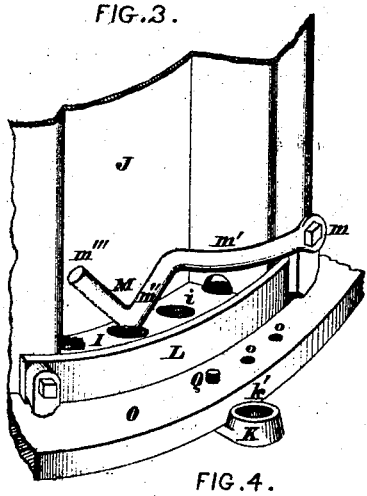
Figure 5:
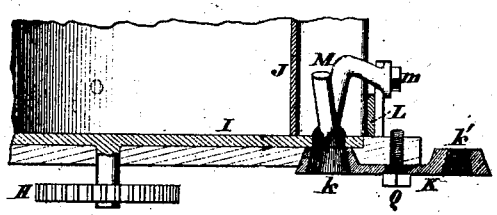
Figure 4:
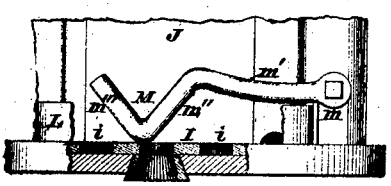
Figure 6:
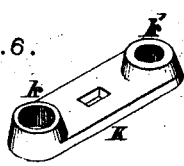

Figure 1 is a perspective view of a corn-planter or drill embodying my invention, a portion of the handles and frame being broken away. Fig. 2 is a horizontal section through the ground-wheel. Fig. 3 is an enlarged perspective view of the rear portion of the grain-box or hopper and its accessories. Fig. 4 is a vertical section of the parts shown in Fig. 3. Fig. 5 is a vertical section of the parts shown in Fig. 3, taken at right angles to the section shown in Fig. 4. Fig. 6 is a perspective view of the reversible gage-plate.

The frame has two horizontal beams, A B, to whose front ends is journaled the shaft or axle C of the ground or drive wheel.

The shaft C, at its midlength, carries a disk, D, which forms the central portion of the ground-wheel, the outer annular part E of which is attached to the disk D by bolts $c$, which traverse the said annular part, and lugs projecting radially from the said disk D. The tread $e'$ of the ground or drive wheel is V-formed, (in transverse section,) so as to enable it to cut through or turn aside any clods lying in its path.

The disk has upon its side three concentric gears, $d$ $d'$ $d''$, with either of which is made to engage a pinion, F, adjustable upon a shaft, G, whose worm, $g$, engages a worm-gear wheel, H, upon the lower end of the vertical shaft of the seed-disk I, which disk forms the inner bottom of the seed-hopper.

The back of the seed-hopper has a recessed part, J, (similar to that shown in my patent aforesaid,) to disclose a portion of the seed-disk to the view of the husbandman, who is thus enabled to see that the operation is properly progressing.

A curb, L, serves to prevent the escape of corn from the edge of the seed-disk at its exposed part.

M is a peculiarly-bent drop-finger or forwarder, whose office it is to remove any superfluous grains from the top of the seed-cavity $i$ before reaching the seed-discharge aperture $k$ of the gage-plate K.

The office of the forwarder is also to force the grain contained in the seed-cavity $i$ downward from the said cavity, overcoming any jam that may have taken place owing to the wedging in of two or more grains or from other cause. The form of the forwarder and divider M is shown in Figs. 1, 3, 4, and 5, and is such as to freely allow either a forward or backward rotation of the seed-disk, owing, first, to the fact that the inclination of the operative parts is the same on both sides, so as to be raised with equal freedom by either side of the cavity $i$; second, the forwarder is so bent as to allow its pivot-point $m$ to be located in such a position that the operating part of the forwarder shall be raised vertically from the seed-disk, which is not the case where the pivot-point is placed much above the level of the seed-disk, as heretofore.

The part $m'$ of the forwarder M extends in a nearly horizontal plane, and is curved inward toward the hopper; the portion $m''$ turns downward at an angle of about forty-five degrees with the horizontal seed-disk; and the portion $m'''$ extends rectangularly from the portion $m''$—thus extending upward at an angle of about forty-five degrees.

The seed-box or hopper is hung in a manner precisely similar to that described in my patent No. 54,642 aforesaid, being arranged to turn on a pivot at its front, so as to connect or disconnect the worm-gear by which the seed-disk is operated; the hopper being held in either position by a hook, N, which engages in either of the holes $o$ in the base-plate O of the hopper.

The gage-plate K is attached by a screw, Q, traversing it at its midlength to the base-plate O, and has at its ends flaring holes $k\ k'$, either of which may be made to form the throat of the seed-cavity $i$, according as the grain is larger or smaller, the holes being, as shown in Fig. 6, diverse in size. The outer face of the portions of the gage-plate containing the holes $k\ k'$ is made to fit a similarly-shaped cavity or countersink in the base-plate, as shown in Figs. 4 and 6. The object of this gage-plate is to enable the ready conversion of the corn-drill into a drill for planting any other seed.

The grain-spout R is inclined backward, and flared to such an extent that any obstruction taking place therein can be readily observed by the operator. The lid S of the seed-hopper has a backward extension, $s$, to form a roof to the wide and backwardly-extending mouth of the spout R, and also to the exposed portion of the seed-disk I and parts adjacent.

The cutter or colter T is attached to the lower side of the cross-bar U* of the frame. The upper part of said cutter is curved in a line nearly concentric with the wheel, and the lower portion $t$ is curved downward and backward, so as to form what is known as a jumping-cutter, so as to divide small roots and clods, and to carry the share over large roots, rocks, or other fixed objects.

The catch V, by which the cover or lid S of the seed-hopper is held down, is made of a thin plate of spring-steel, firmly attached to the front side of the hopper by its lower part, and its upper part being bent into the requisite Z form, it makes a cheap and efficient catch.

The portion of the edge of the lid coming in contact with the catch V is slightly curved upward, so as to improve the action of the catch.

U U' are the covering-shares, which have a series of holes, $u$, to enable their attachment to the beam by means of bolts Z and holes $u'$ for attachment to the rear end of the brace-rod W.

The fore end of the brace-rod has two or more holes, $w$, to receive the bolts Z, by which the brace is attached to the beam.

The shares incline backward toward their lower ends, so as to allow any trash to slide off beneath their points, and also to enable them to ride over fixed objects, such as roots or stones, without breaking the share or brace. This inclination of the shares may be adjusted by means of the holes $u'$ in the share, or the holes $w$ in the brace, by removing the attaching-bolt from one hole to another. The vertical adjustment of the shares is accomplished in a similar manner by means of the holes $u$.

The shares may be more or less inclined to the line of draft, to cause them to throw more or less earth, by the insertion of a small wedge, X, beneath either edge of the upper end of the share and the frame.

The beam to which the share U' is attached has additional bolt-holes, $a$, to allow the setting backward of both the share and brace, so as to increase the distance between the shares, and allow large clods to pass between them.

The seed-hopper is shown as having but one seed-exit, but it is obvious that others may be added, which may have discharge into and be deposited by additional spouts.

I claim herein as new and of my invention—

1. The gear-disk D, forming the center or hub of the ground or drive-wheel and separable therefrom, as shown and described, for the purpose set forth.

2. The rearward extension $s$ of the lid or top S of the seed-hopper, for the purpose of protecting certain operative parts of the seeding mechanism and the upper end of the seed-spout, as set forth.

3. The pivoted gravitating forwarder or drop-finger M $m\ m'\ m''\ m'''$, constructed and having its pivot arranged relatively to the seed-slide, as represented and described, for the purpose set forth.

4. The reversible gage-plate K $k\ k'$, as and for the purpose described.

In testimony of which invention I hereunto set my hand.

JAMES CAMPBELL.

Witnesses:
 GEO. H. KNIGHT,
 JAMES A. CAMPBELL.